United States Patent [19]

Miller et al.

[11] Patent Number: 5,362,847
[45] Date of Patent: Nov. 8, 1994

[54] FLUOROCARBON AND IBMA GRAFTED POLYOXYALKYLENE COPOLYMERS

[75] Inventors: Robert Miller, Columbus; James L. Williams, Reynoldsburg, both of Ohio; George H. Greene, Randolph, N.J.

[73] Assignee: Karlshamns AB, Karlshamns, Sweden

[21] Appl. No.: 799,155

[22] Filed: Nov. 27, 1991

[51] Int. Cl.$^5$ .................. C08G 65/00; C08G 65/04
[52] U.S. Cl. ................................ 528/403; 528/401; 528/405; 528/407; 528/421; 525/523; 252/8.6; 252/8.8; 427/389.7; 427/389.9; 427/393; 427/393.5; 427/393.6; 427/397
[58] Field of Search ............ 528/403, 405, 407, 421, 528/401; 525/403, 523, 409; 252/8.6, 8.8; 427/389.9, 389.7, 393, 393.5, 393.6, 397

[56] References Cited

U.S. PATENT DOCUMENTS 3,920,614 11/1975 Kirimoto et al. .................. 524/544
4,463,035 7/1984 Greene ............................ 427/389.9

FOREIGN PATENT DOCUMENTS 61-23616 2/1986 Japan ........................ C08F 255/02

*Primary Examiner*—John Kight, III
*Assistant Examiner*—Richard Jones
*Attorney, Agent, or Firm*—Burns, Doane, Swecker & Mathis

[57] ABSTRACT

A graft copolymer is produced by grafting both at least one perfluoroacrylate and at least one N-(oxymethyl)acrylamide, e.g., IBMA, onto a poly(oxyalkylene) composition. This graft copolymer is water dispersible prior to crosslinking while after crosslinking, it becomes a highly durable hydrophobic and oil repellent coating for fibers, textiles, and the like.

12 Claims, No Drawings

FLUOROCARBON AND IBMA GRAFTED POLYOXYALKYLENE COPOLYMERS

BACKGROUND OF THE INVENTION

The present invention relates to a copolymer in which certain fluorocarbons such as perfluoroacrylates and certain optionally substituted N-(oxymethyl)-acrylamide monomers, such as IBMA, are grafted onto a poly(oxyalkylene) compositions. The crosslinkable graft copolymer according to the present invention has a number of surprising properties including the fact that prior to crosslinking it is hydrophilic while subsequent to crosslinking, it becomes hydrophobic.

A variety of fluorocarbon surface treatments are recognized in the art. However, these fluorocarbon materials suffer from a number of drawbacks.

For example, the art employed these fluorocarbon materials in solvents such as chlorofluorocarbons (CFC) and/or a volatile organic compounds (VOC) which solvents are clearly not favored in view of those environmental problems associated with their use.

In addition, these fluorocarbon materials also suffer from inadequate wetting characteristics. In particular, these fluorocarbons are not free flowable upon removal of the solvent. Instead, they are a viscous, glassy solid at room temperature. Furthermore, they are still not considered flowable even upon exposure to moderate temperatures, i.e., 150°–180 ° C.

The importance of this disadvantage can be found in the fact that due to their inadequate wetting characteristics, the uniformity of their treatment is erratic, i.e., the active solids do not form a uniform coating or treatment onto the substrate to which they are applied.

These fluorocarbon materials currently employed in the art are typically mixed with resins such as polyurethane which act as an adhesive for bonding the fluorocarbons to the fiber. However, due to the surface energy associated with these traditional fluorocarbons, one still does not obtain adequate "wetting" on the fiber surface.

The grafting of olefinic materials to organic compounds has also been recognized in the art.

For example, U.S. Pat. No. 3,418,354 to Wheeler relates a process for producing an olefin-poly(oxyalkylene) graft copolymer in which an olefin and a peroxide compound containing a peroxide group linked to a tertiary carbon atom are slowly and simultaneously added to a poly(oxyalkylene) compound.

This patent also discusses the ability to produce graft copolymers from certain fluoro-olefins. However, these fluoro-olefins are volatile materials and thus difficult to work with as illustrated by the use of high pressure vessels within the examples of this patent.

In addition, U.S. Pat. No. 4,463,035 to Green and U.S. Pat. No. 4,463,036 to Totten and Sabia, both relate to the production of graft copolymers where certain N-(oxymethyl)-acrylamide compounds, such as IBMA, are grafted onto a poly(oxyalkylene). In each patent, the graft polymers are employed as a finish for textile fibers.

However, the graft copolymers recognized within the art suffer from certain undesirable limitations. For example, the graft copolymers disclosed in the Green and Totten et al patents provide a hydrophilic surface treatment for fibers and textiles and thus, are not useful in a variety of environments.

Accordingly, the need still exists for an improved coating for use with fibrous materials.

SUMMARY OF THE INVENTION

Among other factors, the present invention relates to the surprising discovery that during the grafting of both certain fluorocarbon materials and certain optionally substituted N-(oxymethyl)acrylamides onto a poly(oxyalkylene) composition provides a crosslinkable graft copolymer which is water dispersible prior to crosslinking and which becomes a durable, hydrophobic and oil repellent coating after crosslinking.

In particular, the present invention comprises a graft copolymer produced by grafting both (a) at least one perfluoroacrylate and (b) at least one optionally substituted N-(oxymethyl) acrylamide onto a poly(oxyalkylene) composition.

In other aspects, the present invention relates to compositions including this graft copolymer and a method for imparting hydrophobicity and/or oil repellency to an article in which the article is treated with this graft copolymer.

DETAILED DESCRIPTION OF THE PREFERRED EMBODIMENTS

The present invention involves the grafting of both a perfluoroacrylate and an optionally substituted N-(oxymethyl) acrylamide onto a poly(oxyalkylene). This grafting is performed in the presence of certain peroxides by techniques which are recognized in the art. See, for example, the Wheeler, Green, and Totten et al. patents which are discussed above and which are herein incorporated by reference.

The poly(oxyalkylene) compounds employed within the present invention include those which are recognized in the art. These polymeric compounds can be selected from among homopolymers such as poly(oxyethylene), poly(oxypropylene), and poly(oxybutylene), or can be copolymeric materials such as copolymers of oxyethylene and oxypropylene. In addition, these materials can be started with alcohols (such as butanol and triglycerol) and thus include the residue of an alcohol within the polymer compound.

Specific examples of suitable poly(oxyalkylene) compounds include poly(oxyethylene)(co-oxypropylene) monobutylether (also known as butanol started poly(oxyethylene co-oxypropylene)), and ethoxylated, propoxylated triglycerol (also known as triglycerol started poly(oxyethylene co-oxypropylene)).

Moreover, compounds useful in the present invention are available from Union Carbide under the trade names UCON, CARBAWAX, and TERGITOL.

Examples of suitable perfluoroacrylates include perfluoroalkyl ethylacrylate (such as Fluowet AE(K) from Hoechst Celanese), 2-(N-butylperfluoro-octanesulfonamido) ethylacrylate (such as FX-189 from 3M), 2-(N-ethylperfluorooctanesulfonamido) ethylacrylate (such as FX-14 from 3M), as well as certain compounds which are available from DuPont under the Zonyl trademark. Examples of suitable compounds under the Zonyl name are TA—N fluoroalkylacrylate, $R_fCH_2CH_2OOCC(H)=CH_2$, and TN fluoroalkylmethacrylate, $R_fCH_2CH_2OOCC(CH_3)=CH_2$, in each case $R_f$ is $F[CF_2]_n$.

The optionally substituted N-(oxymethyl)-acrylamides which can be employed in the present invention include those compounds having the following formula:

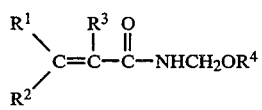

wherein $R^1$, $R^2$, $R^3$, and $R^4$, may be the same or different and are hydrogen atoms or a monovalent hydrocarbon radical containing from 1 to about 6 carbon atoms.

Illustrative suitable monomers are methoxymethyl acrylamide, ethoxymethyl acrylamide, N-butoxymethyl acrylamide, allyloxymethyl acrylamide, N-butoxymetharylamide and preferably, N-methylol acrylamide and N-(iso-butoxymethyl)-acrylamide (IBMA).

The peroxides which can be employed in the present invention include those peroxide compounds containing a peroxide group linked to a tertiary carbon atom. Examples of suitable peroxide compounds include 2,5-dimethyl-2,5-di(t-butylperoxy)-3-hexyne; 2,5-dimethyl-2,5-(t-butylperoxy), hexane; 1,1-bis(t-butylperoxy) 3,3 5-trimethylcyclohexane, butylperoxy-2-ethylhexanoate; t-butylperoxybenzoate; and t-butylperoctoate. These compounds are available, for example, under the Lupersol trademark of Atochem.

As discussed above, the graft copolymer of the present invention has certain very surprising properties and characteristics. In particular, the graft copolymer is water dispersible prior to crosslinking and, thus, can be employed in a variety of environments. Furthermore, prior to crosslinking, it provides a degree of hydrophobicity and oil repellency, while after crosslinking by techniques recognized in the art, e.g., heating, it becomes a highly durable hydrophobic and oil repellent coating.

Accordingly, this graft copolymer can be employed as a treatment in virtually any environment where hydrophobicity and/or oil repellency is desired. For example, it can be employed as a treatment for fibers (both natural and synthetic), textiles, wood, ceramics, metals, glass, plastic including thermosets and enamels as well as being a component of natural or synthetic latices such as paints, polishes such as auto polishes, floor polishes, and shoe polishes, and the like.

Because of its hydrophilic nature prior to crosslinking, it can be readily employed as a treatment in a water dispersible form. In this regard it can be employed with or without resins such as polyurethanes. This allows the copolymer to be employed as a treatment in numerous environments, such as carpets, concretes, clays, and the like. Moreover, when included in such a composition it can be employed with, for example, emollients, cleaning agents, surfactants, detergency builder materials, fillers, electrolytes, emulsifiers, viscosity modification agents and the like.

One particular environment in which the graft copolymer of the present invention can be employed is as a surface treatment for fibers and in particular carpet fibers. In this environment, graft copolymer according to the present invention can provide greatly superior oil and soil repellency of the treated fibers.

In order to further illustrate the present invention and the advantages associated therewith, the following specific examples are given, it being understood that same are intended only as illustrative and in nowise limitative.

EXAMPLE

The following example illustrates the synthesis of a triglycerol-started ethylene oxide/propylene oxide/-block copolymer grafted with Fluowet AE(K) and IBMA.

| Regent | Amount Used (g) | Molecular Weight | Moles Used | Weight Percent |
| --- | --- | --- | --- | --- |
| Triglycerol-started EO/PO block copolymer | 712 | 3952 | 0.180 | 32.7 |
| Fluowet AE(K) | 1004 | 558 | 1.799 | 46.2 |
| N-(iso-butoxymethyl acrylamide | 284 | 157 | 1.809 | 13.1 |
| t-Butyl percotoate | 174 | 200 | 0.868 | 8.0 |

Procedure:

A 5-neck, round-bottom flask (5000 ml), equipped with mechanical stirrer, heating mantle, thermometer, condenser and two addition funnels, was charged with triglycerol-started EO/PO block copolymer (712 g) and xylene (1264 ml). One addition funnel contains a mixture of N-(iso-butoxymethyl)acrylamide, (IBMA), (284 g), t-butyl peroctoate (174 g) and xylene (506 ml). The second addition funnel contains a mixture of Fluowet AE(K) (1004 g) and xylene (758 ml). The Fluowet AE(K) and xylene mixture was heated to 70°-80° C. by means of electrical heat tape wrapped around the exterior of the addition funnel.

The entire apparatus was purged with nitrogen and blanketed with nitrogen throughout the reaction sequence. The contents of the round-bottom flask were stirred and heated to 120°-125° C. Once all temperatures have equilibrated, a dropwise addition of the IBMA/t-butyl peroctoate mixture was commenced. After approximately ten percent of the mixture was added, the dropwise addition of the Fluowet AE(K) was begun. The flow rates are adjusted so as to complete the addition of all reagents, simultaneously, in approximately 3.5 hours. Once the addition is complete, the reaction was allowed to proceed for one hour. Xylene was then removed under reduced pressure to yield an orange, viscous semi-solid.

While this invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims including equivalents thereof.

We claim:

1. A crosslinkable, hydrophilic graft copolymer produced by grafting both (a) a perfluoroacrylate and (b) at least one N-(oxymethyl) acrylamide having the following formula

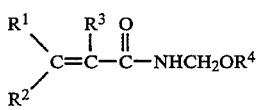

wherein $R^1$, $R^2$, $R^3$, and $R^4$ may be the same or different and are a hydrogen atom or a monovalent hydrocarbon radical containing from 1 to about 6 carbon atoms onto poly(oxyalkylene) compositions, which copolymer, upon crosslinking, is hydrophobic and oil repellant.

2. The graft copolymer according to claim 1, wherein (b) is N-(isobutoxymethyl) acrylamide.

3. The graft copolymer according to claim 1 wherein (b) is N-methylolacrylamide.

4. The graft copolymer according to claim 2, wherein the perfluoroacrylates are selected from the group consisting of perfluoroalkyl ethyl acrylate, 2-(N-butylperfluorooctanesulfonamido) ethylacrylate, and 2-(N-ethylperfluorooctanesulfonamido) ethylacrylate, TA-N fluoroalkylacrylate, and TN fluoroalkyl-methacrylate.

5. The graft copolymer according to claim 2, wherein the poly(oxyalkylene) is selected from the group consisting of poly(oxyethylene co-oxypropylene) monobutylethers, and ethoxylated, propoxylated triglycerols.

6. A composition comprising a fiber and the graft copolymer according to claim 2.

7. A composition according to claim 6 wherein the fiber is a natural or synthetic fiber.

8. A composition comprising a graft copolymer according to claim 2 and at least one emollient, cleaning agent, surfactant, detergency builder material, filler, electrolyte, emulsifier, viscosity modification agent or resin.

9. A method for imparting hydrophobicity and oil repellency to an article which comprises treating the article with a crosslinkable, hydrophilic graft copolymer according to claim 2 and crosslinking the copolymer.

10. The method according to claim 9 further comprising crosslinking the graft copolymer.

11. The method according to claim 10 wherein the article is selected from the group consisting of fibers, textiles, woods, ceramics, metals, glass, plastics, concretes, clays, and fillers.

12. The method according to claim 10 wherein the graft copolymer is present within a natural or synthetic latex composition.

* * * * *